United States Patent
Neho et al.

(10) Patent No.: US 6,950,303 B2
(45) Date of Patent: Sep. 27, 2005

(54) ELECTRIC DEVICE WITH LIQUID COOLING SYSTEM AND METHOD OF MANUFACTURING THEREOF

(75) Inventors: Yasushi Neho, Atsugi (JP); Daichi Hotta, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 70 days.

(21) Appl. No.: 10/356,503

(22) Filed: Feb. 3, 2003

(65) Prior Publication Data
US 2005/0083647 A1 Apr. 21, 2005

(30) Foreign Application Priority Data
Feb. 8, 2002 (JP) .............................. 2002-032659

(51) Int. Cl.[7] .............................................. H05K 7/20
(52) U.S. Cl. ...................... 361/687; 361/699; 361/704; 165/104.33; 174/15.2
(58) Field of Search ................................ 361/680–683, 361/686–689, 699–702, 704, 709, 711; 16/233; 165/80.2, 80.3, 80.4, 86, 104.33, 185; 710/303, 710/304; 174/15.2

(56) References Cited

U.S. PATENT DOCUMENTS

| | | | |
|---|---|---|---|
| 5,764,483 A | | 6/1998 | Ohashi et al. |
| 6,094,347 A | * | 7/2000 | Bhatia ......................... 361/695 |
| 6,496,367 B2 | * | 12/2002 | Donahoe et al. ............ 361/687 |
| 6,507,493 B2 | * | 1/2003 | Ueda et al. .................. 361/704 |
| 6,510,052 B2 | * | 1/2003 | Ishikawa et al. ............ 361/687 |
| 6,587,336 B2 | * | 7/2003 | Chu et al. .................... 361/687 |
| 6,691,197 B2 | * | 2/2004 | Olson et al. ................. 710/304 |
| 2002/0091468 A1 | | 7/2002 | Nagashima et al. |

FOREIGN PATENT DOCUMENTS

JP 2000-222072 8/2000

* cited by examiner

*Primary Examiner*—Lisa Lea-Edmonds
*Assistant Examiner*—Anthony Q. Edwards
(74) *Attorney, Agent, or Firm*—McDermott Will & Emery LLP

(57) ABSTRACT

An electronic device has a first case which houses a part of a liquid cooling system and mounted components, and a second case which houses the other part of the liquid cooling system. In one example, the second case houses and a display unit. In an all-in-one computer example, the second case may serve as the access lid. In the electronic device, the liquid cooling system has a pump which feeds cooling liquids a heat block which receives heat from an electronic component, a pipe which transfers heat from the liquid to a heat sink, and a tube which connects these parts with one another. The first case has a first board mounted with the electronic component over a part of the liquid cooling system. Methods of manufacturing electronic devices with such cooling systems also are disclosed.

18 Claims, 7 Drawing Sheets

ELECTRIC DEVICE WITH LIQUID COOLING SYSTEM AND METHOD OF MANUFACTURING THEREOF

BACKGROUND

The subject matter relates to electronic device with a liquid cooling system, and more specifically relates to the technology of liquid cooling system applied to electronic device, for example, personal computers typified by notebook computers.

For recent electronic devices, such as personal computers, the amount of heat produced in the devices has been significantly increased with remarkable enhancement of performance. Therefore, there are demands for technologies to remove such heat.

Conventional cooling methods for electronic devices include a liquid cooling system wherein electronic components, such as heat producing electronic components, are cooled using cooling liquid as coolant. In U.S. Published Patent Application No. 02002/0091468 a liquid cooling system for notebook personal computers and all-in-one computers is disclosed. The liquid cooling system in the above document mainly comprises a pump, a jacket, a heat sink, and a pipe.

To build the liquid cooling system into a main unit case, components, such as pump, jacket, and heat sink, are built into the enclosure of the electronic device, and then are connected to one another with the tube. Alternatively, the components are connected in loop shape with a tube, and the components as looped are then built into a case. To assemble a main unit, a main board may be built into a case first with a jacket mounted thereon.

In the case components are placed in a narrow space, a tube is pulled during assembling work, and the tube is apt to be put under load. As a result, the tube is apt to come off at a joint, or can be damaged. This may cause troubles, such as water leakage during use of device. In the case the mounting space is limited, as mentioned above, the tube is apt to be strained when the tube is routed, and there is room for improvement in terms of ease of assembly.

In the case of electronic devices, such as notebook personal computers, the enclosure of a main unit and the enclosure of a display unit are separated from each other, and at least one hinge is provided for connecting the enclosures. In the case the liquid system is installed over different enclosures of such devices, the space is narrower, and wiring work is further difficult to perform. The tube is apt to be exposed to load at the hinge. And a problem that the tube is apt to be damaged at these points by repeatedly opening and closing the display case 2 arises.

If cooling liquid leaks from the liquid cooling system and wets electronic components on the main board or in other areas, damage or trouble may result.

SUMMARY

An electric device with a liquid cooling system has a first case which houses a part of a liquid cooling system and mounted components, and a second case which houses the other parts of the liquid cooling system and a display unit. The liquid cooling system installed in the electronic device includes a pump which feeds cooling liquid, a heat block which receives heat from a electronic component. The first case has a first board mounted with the heat block, and which is located above part of the liquid cooling system.

In another aspect, an electric device with a liquid cooling system has a case enclosing at least a part of the liquid cooling system, a board, and some components mounted on the board. The case has at least one face to be opened. A heat block is one of the parts of the liquid cooling system. The heat block is disposed in the inner side across the board from the face to be opened.

Additional objects, advantages and novel features of the examples will be set forth in part in the description which follows, and in part will become apparent to those skilled in the art upon examination of the following and the accompanying drawings or may be learned by production or operation of the examples. The objects and advantages of the inventive concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way example only, not by way of limitations. In the figures, like reference numerals refer to the same or similar elements.

DETAILED DESCRIPTION

Figure 1:
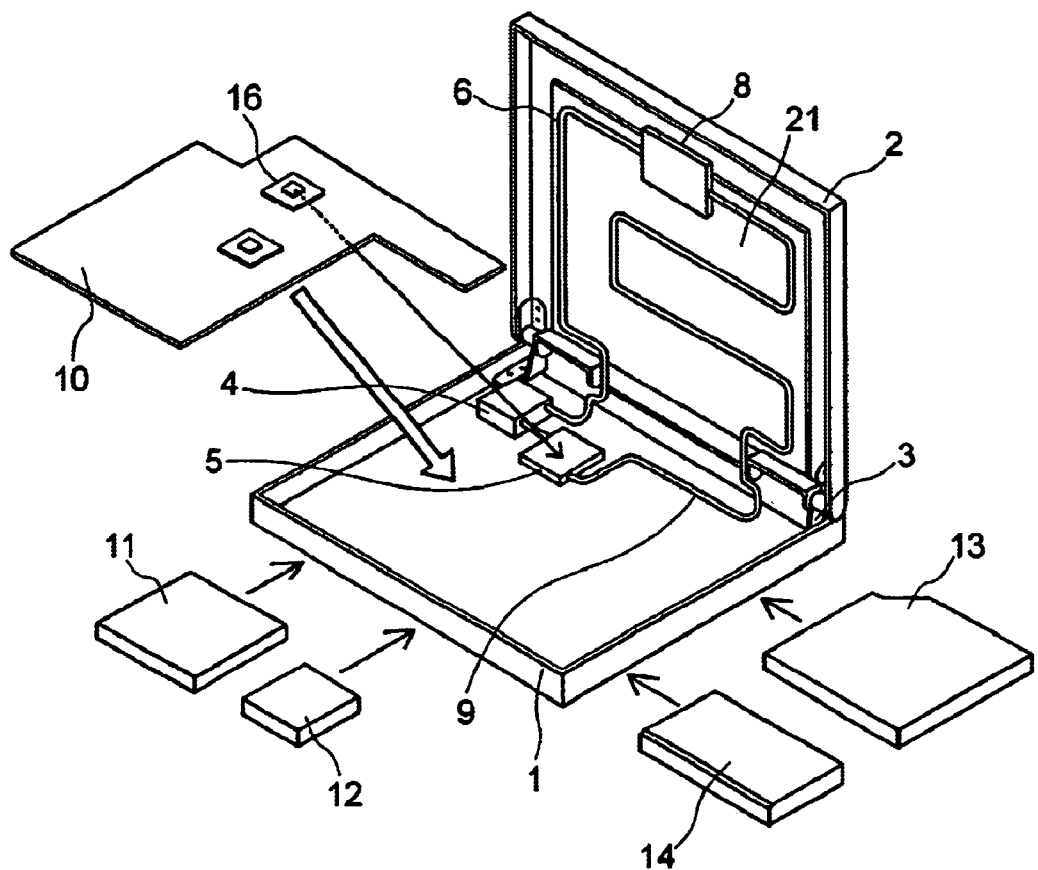
FIG. 1 is a perspective view illustrating an example of an electronic device.
Figure 2:
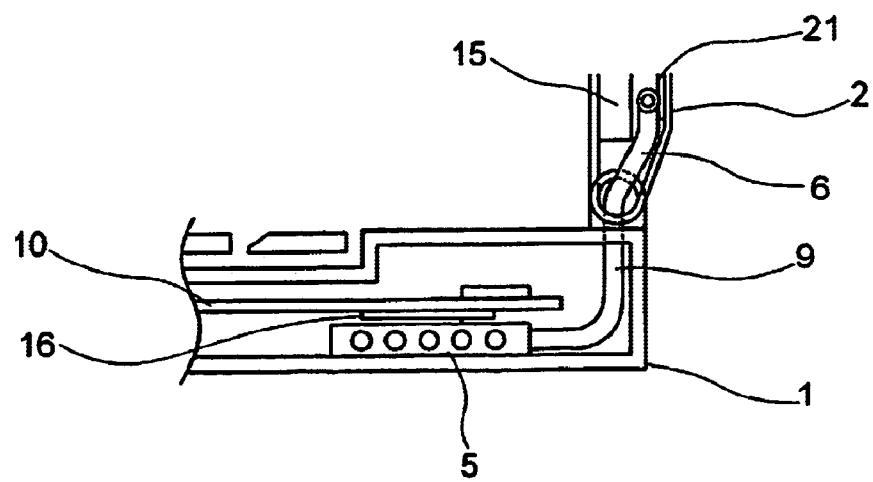
FIG. 2 is a drawing a cross section of an example of a jacket of the electronic device.

Referring to FIGS. 1 and 2, an exemplary embodiment will be described. FIG. 1 is an exploded perspective view illustrating the whole structure of the electronic device with the liquid cooling system. FIG. 2 is a drawing illustrating a cross section around a jacket of the electronic device. A notebook personal computer is an example of the electronic device for the purpose of explanation in the description.

The electronic device illustrated in FIG. 1 includes a main unit case 1 and a display case 2 as enclosures for a system unit. The main unit case 1 is a first enclosure which houses mounted components. The display case 2 is a second enclosure which houses a display unit, e.g. a liquid crystal display unit.

FIG. 1 shows the electronic device without boards, such as main board, and other mounted components, such as peripheral devices 11 to 14, removed. And the electronic device is illustrated with the display case 2 open in FIG. 1. Thus the liquid cooling system is installed in the main unit case 1 and the display case 2 before board-mounted components are installed.

In the electronic device, a keyboard (not shown) is mounted on the upper face of the main unit case 1 which face is opposed to the display case 2. That is, after installation of the liquid cooling system, a board 10 and peripheral devices 11 to 14 are installed and the keyboard is then installed thereon. The face on which the keyboard is mounted is the face to be opened in the electronic device. When the electronic device is assembled or is dissembled, the main board or peripheral devices 11 to 14 are taken in and out from this opening face.

The main unit case 1 and the display case 2 are joined with each other at joint. At least one hinge 3 is used for the joint. The display case 2 pivots on the hinge 3. The display case 2 is opened and closed by this pivoting. When the display case 2 is closed, the display case 2 works as lid portion to cover the main unit case 1 from above and the main unit case 1 works as bottom portion.

The liquid cooling system includes a pump 4, a jacket 5, a pipe 6, a heat sink 21, a reservoir tank 8, and at least one tube 9. Through these parts, cooling liquid circulates and removes heat from a heat producing electronic component 16. Examples of liquids as coolant usable in the liquid cooling system include pure water (fresh water) or anti-freezing solutions.

The pump 4 is a drive, which feeds cooling liquid into the liquid cooling system. At least one jacket 5 is abutted against one or more heat producing electronic component 16 and thereby transfers heat from the heat producing electronic component. Thus the jacket 5 is a heat block and receives heat from the heat producing electronic component 16. The pipe 6 forms a circulation path for cooling liquid among the pump 4, the jacket 5, the heat sink 21, and the like. That is, cooling liquid is circulated in the pipe 6, which conveys the cooling liquid among the parts. A metal pipe is used, which have good thermal conductivity.

A "sink" is a device or place for disposing of energy, in this case, heat collected from the electronic device. In the example, the heat sink 21 is a heat radiating portion housed in the display case 2. The liquid crystal display unit is installed in the inner display case 2, and the heat sink is installed on the outer display case 2. "The inner display case 2" means the side of the display case 2 faces toward the main unit case 1 when the display case 2 is closed. "The outer display case 2" means the side is the reverse side of the side facing toward the main unit case 1 when the display case 2 is closed.

The structure above allows high ability of heat radiation. Usually a notebook personal computer is used with the display case 2 opened. It means, when the heat cooling is necessary, the outer display case 2, e.g. the heat sink 21, faces the air. And the structure above also allows a large area for the heat sink 21. The heat sink 21 can be installed almost the same size as the display unit.

The heat sink 21 is a plate that facilitates heat radiation from cooling liquid whose temperature is raised by heat received by the jacket 5. The heat sink 21 is so designed that part of the pipe 6 is abutted against a plate with good heat transferring capability and heat is dissipated from the cooling liquid through the metal pipe 6. Heat is transferred from the pipe 6 to the heat sink 21. Alternately, the heat sink may have the structure where the pipe for circulating cooling liquid is integrated with a wall face of the heat sink 21. Alternately, the pipe can be abutted against the wall face of the display case 2. In this case, the heat sink 21 is the pipe 6 and the wall face of the display case 2 with which the pipe 6 is connected.

The reservoir tank 8 is provided to cope with a problem that cooling liquid is inevitably evaporated from the liquid cooling system. Storing cooling liquid in the reservoir tank 8 enhances the allowance of amount of evaporated cooling liquid. The reservoir tank 8 is preferred in the display unit 2. The reservoir is also a kind of an air chamber for the air in the liquid cooling system. The ability of a pump will be lowered if the air circulation occurs in the pump, or around the liquid cooling system. To avoid the lowered efficiency of the pump, the reservoir tank 8 as an air chamber is preferred to be disposed at the higher position than other parts of the liquid cooling system when the electric device is operating.

The tube 9 connects the parts (the jacket 5, the pipe 6, the heat sink 21, and the reservoir tank 8) with one another. With respect to the tube 9, a flexuous and elastic tube is used to connect the parts of the liquid cooling system. A flexible material, such as rubber, is used for the material of the tube so that the tube can be appropriately routed in narrow places. In the case of the notebook personal computer in FIG. 1, the display case 2 pivots around the hinge 3; therefore, the tube 9 installed in the main unit case 1 is extended to the hinge 3 to the display case 2.

The liquid cooling system is dividedly installed in the main unit case 1 and the display case 2. The main unit case 1 incorporates a part of the liquid cooling system: the pump 4, the jacket 5, and part of the pipe 6. The display case 1 incorporates the heat sink 21, the reservoir tank 8, and part of the pipe 6. However, embodiments are not limited to this example. Preferably, the case for housing a heat producing electronic component (the main unit case 1) also incorporates at least the jacket 5. Therefore, other components and the pump 4 housed in the main unit case 1 may be housed in the display case 2.

System unit components, including a main board (mother board) 10, a flexible disk drive (FDD) 11, a hard disk drive (HDD) 12, a CD-ROM drive 13, a battery 14, and a liquid crystal display unit 15 (not shown in FIG. 1), are installed in the main unit case 1 mounted with the liquid cooling system.

The heat producing electronic component 16 is, for example, a CPU (an central processing unit or an processor) mounted on the board 10. The HDD 12 and the battery 14 are the other examples of heat producing electronic component s not mounted on the board 10. Cooling liquid delivered from the pump 4 goes through the jacket 5 placed on the heat producing electronic component 16. Here, heat from the heat producing electronic component 16 is transferred to the cooling liquid. The cooling liquid further goes through the hinge 3, and flows through the pipe 6 installed on the heat sink 21. Heat of the liquid is transferred from the pipe 6 to the heat sink 21, and is thereafter externally diffused from the heat sink 21. The cooling liquid cooled by transferring heat to the heat sink 21 goes back to the pump 4, and flows through the liquid cooling system by the same route. The arrangement or order of the parts is not limited in this example.

The main board 10 mounted with various electronic components, including the CPU as a heat producing electronic component 16, is positioned above the liquid cooling system including the pump 4, the jacket 5, and part of the tube 9. Preferably, the main board 10 mounts the heat producing electronic component 16 on the lower face. "Lower face" refers to a face opposing the bottom of the main unit case 1. Or, letting the face on which the keyboard is to be mounted, i.e. the face to be opened, be "top", "lower face" refers to the backside of the face opposite the keyboard. When the electronic device is assembled, the heat producing electronic component 16 is brought into contact with the jacket 5 in the liquid cooling system, and the heat producing electronic component 16 is thereby cooled.

The main board 10 can mount the heat producing electronic component 16 on the top face. The jacket 5 receives heat from the heat producing electronic component 16 through the main board 10. In this case, tt is not necessary to redesign a main board 10 to mount the heat producing electronic component 16 to the lower face of the main board 10.

This assembling structure facilitates routing of the pipe 6 and the tube 9 as compared with prior arts wherein system unit components are installed and then the liquid cooling system is installed. More specifically, an electronic device can be assembled following steps wherein the liquid cooling system is installed in advance, and a mother board and peripheral devices are built in. Load that would be imposed on the joint of the component parts of the liquid cooling system by pulling or twisting the connecting tube 9 is reduced. The electronic device can be assembled with less straining of the liquid cooling system, which requires tight seal.

FIG. 2 illustrates a cross section of a portion close to the jacket 5. As illustrated in FIG. 2, the jacket 5 is placed between the bottom of the main unit case 1 and the main board 10. Between the jacket 5 and the main board 10, the heat producing electronic component 16 to be cooled is mounted on the main board 10. Heat from the heat producing electronic component 16 is transferred downward to the jacket 5. Heat is then transferred toward the upper part of the electronic device by the tube 9 through the hinge 3 in the structure of the liquid cooling system.

Thus, the jacket 5 and the tube 9 through which cooling liquid is circulated during operation of the electronic device are positioned under the main board 10. Therefore, if liquid leakage would occur, the fear that cooling liquid may wet the main board 10 is minimized, and safety in operating the device can be promoted.

With respect to maintenance work for the electronic device, the liquid cooling system need not be taken out or removed when the main board 10 or a peripheral device, such as FDD 11, is taken out of the main unit case. That is, the liquid cooling system and the main board 10 or the peripheral devices as installed do not interface with each other, and thus working efficiency can be enhanced. Further, the fear for load imposed on the parts in the liquid cooling system, especially, the tube 9 is reduced, and maintainability can be enhanced. The above-mentioned effect is brought about with small modification to a conventional liquid cooling system.

With respect to the example in FIGS. 1 and 2, there is explicit description that the main board 10 mounted with the heat producing electronic component 16 is installed over the liquid cooling system. The invention is not limited to this example; if peripheral devices include drives producing heat, positioning such peripheral devices over the liquid cooling system is included in examples.

In the description, a notebook personal computer is taken as example of the electronic device. Those skilled in the art can apply the invention to other devises. For example, the invention is also applicable to an all-in-one computer and the like wherein the main unit case 1 and the display unit are housed in one enclosure. The bottom portion in this case is a front portion of the enclosure, for example, an all-in-one computer wherein a liquid crystal display unit is installed. Contrarily, the lid portion in this case is the backward part of the enclosure, the rear face side of the device.

Figure 9A:
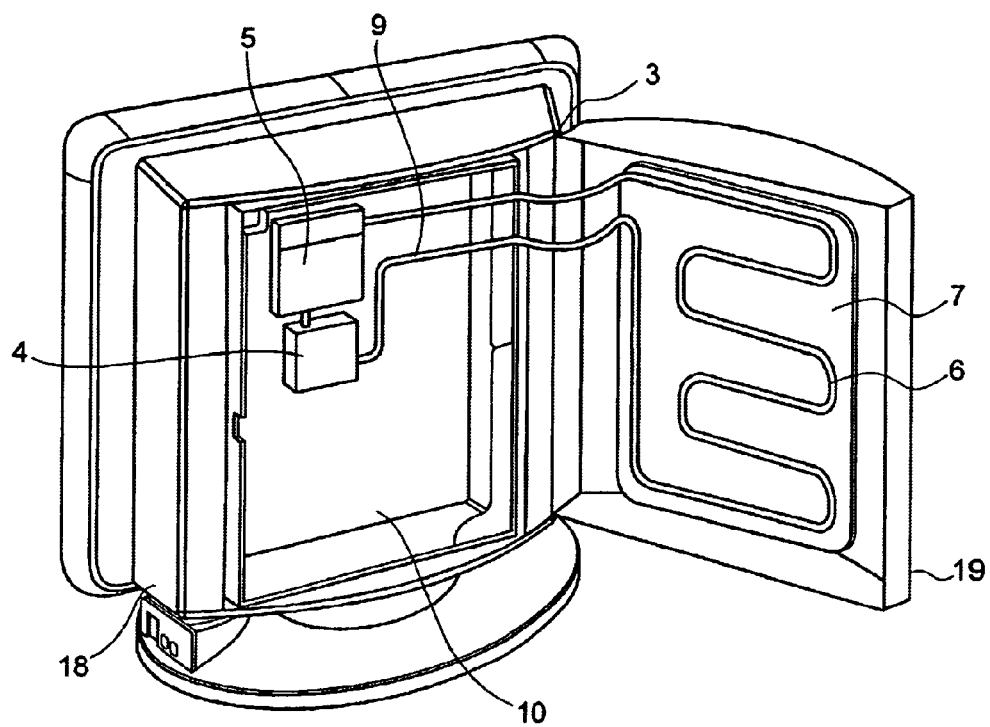
FIGS. 9(*a*) and (*b*) are perspective views illustrating another example of an electronic device.
Figure 9B:
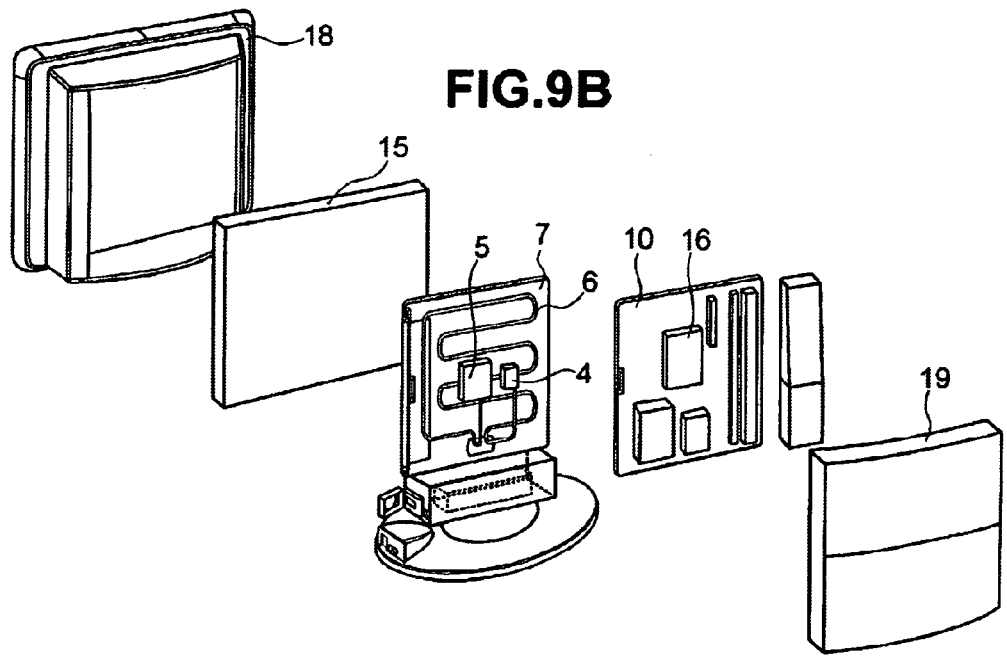

FIGS. 9(a) and (b) show a computer of all-in-one type. The computer in FIG. 9 show, for example, in the case that the all-in-one computer is provided on the rear face side 19 thereof with a heat sink 7 and an opening of the enclosure 17 is formed in the rear face, the following steps may be followed: a liquid crystal display unit 15 is installed at the front portion (as the bottom portion) 18 of the enclosure, part of the liquid cooling system including the jacket 5 is installed, and then a mother board 10 is installed. Further, other parts, including the heat sink 7, may be installed on the rear face side (as the lid portion) 19.

For making repair or the like of the all-in-one computer in FIG. 9, the main board can be accessed just by opening the rear face side 19. That is, such structure that the heat sink 7 is installed on the opening and closing face of the enclosure (the lid portion) 19, part of the liquid cooling system including the jacket 5 is installed at the front portion of the enclosure (as the bottom portion) 18, and the main board 10 is installed near the opening and closing face may be adopted.

Figure 3:
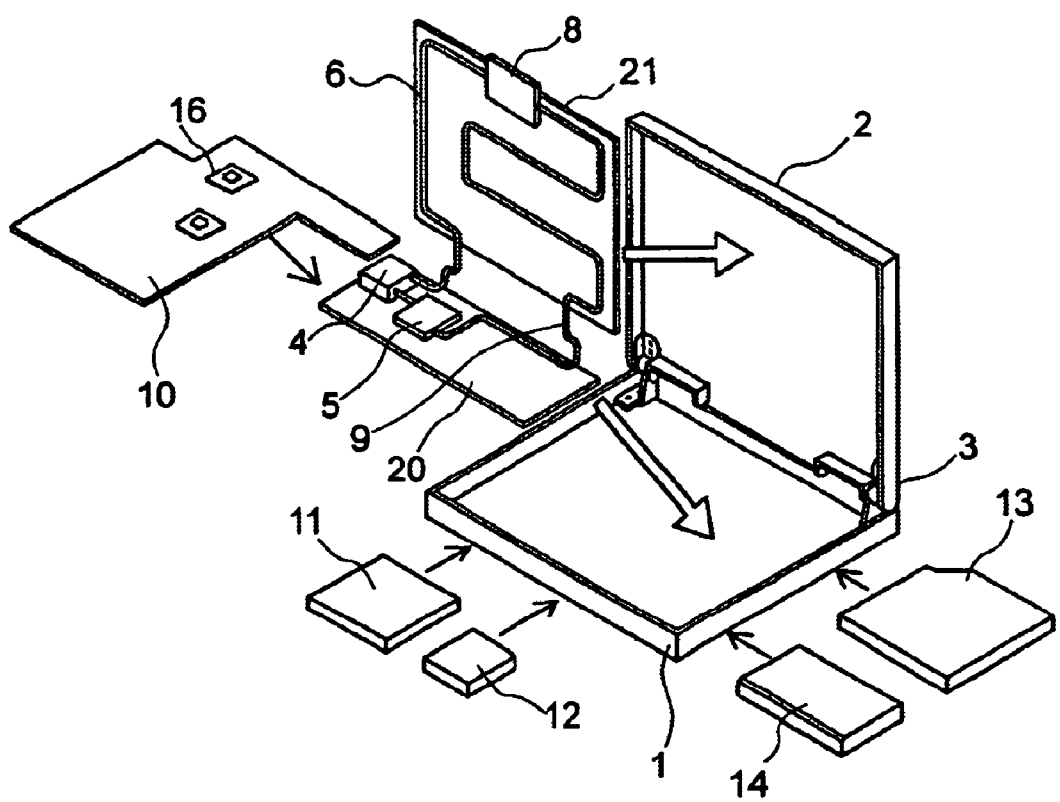
FIG. 3 is an exploded perspective view of another example of an electronic device.

FIG. 3 is an exploded perspective view of another electronic device with a liquid cooling system. The component parts of the liquid cooling system are installed on dispersion plates 20, 21 as heat sinks on the main unit case 1 side and on the display case 2 side respectively.

In FIG. 3, a pipe 6 and a reservoir tank 8 are installed on a first heat sink 21 on the display case 2 side. Meanwhile, a pump 4 and a jacket 5 are installed on a second heat sink 20 on the main unit case 1 side. Further, the individual parts are connected to one another with flexible tube 9.

With respect to method for installation on the heat sinks 20 and 21, the parts may be connected with one another by the tube 9 and be then installed on the heat sinks 20 and 21. Or, the parts may be installed on the heat sinks 20, 21 and be then connected with one another by the tube 9. In the case of the former installing method, it is preferable that the tube 9 should be fixed on the heat sinks 20 and 21 as well. This is because load imposed on the tube 9 is minimized. Thus, what is obtained by installing the individual parts of the liquid cooling system on the two heat sinks 20 and 21 to be housed in respective cases is denominated "a liquid cooling unit."

The liquid cooling unit is installed in the main unit case 1 and the display case 2 separately, and other components are installed thereon. More specifically, the component parts of the system unit, such as a main board 10, a FDD 11, a HDD 12, a CD-ROM drive 13, a battery 14, and a liquid crystal display 15, are installed. At this time, the drives (FDD 11 etc.) that do not produce heat may be juxtaposed with the liquid cooling system, instead of being installed over the liquid cooling system.

With the structure in FIG. 3, not only assembling workability and maintainability but also safety from liquid leakage can be enhanced, as in the liquid cooled electronic device. By placing the main unit case 1 side liquid cooling unit on the heat sink 20 and thereby fixing the positions of the jacket 5 and the like, assembling work can be conducted without paying attention to the relation between the jacket 5 and the heat producing electronic component 16. In terms of working efficiency, it is preferable that all the major parts should be installed on the heat sinks 20 and 21; however, lightweight parts need not be installed. This is because lightweight parts impose lighter loads on the tube 9.

Figure 4:
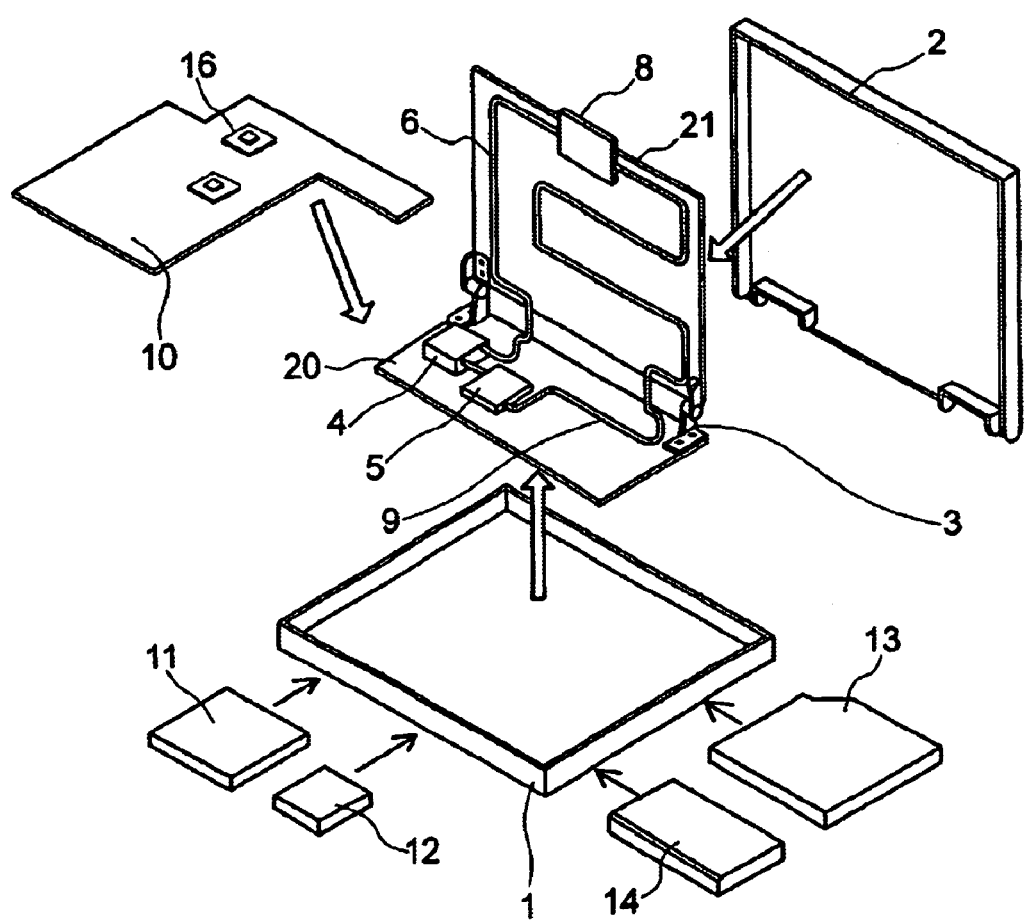
FIG. 4 is an exploded perspective view of an example of an electronic device.

FIG. 4 is an exploded perspective view of a third electronic device with the liquid cooling system. The electronic device has a structure where, in addition to the example in FIG. 3, the main unit case 1 side heat sink 20 and display case 2 side heat sink 21 mounted with the liquid cooling unit are connected with each other by at least one hinge 3 which can be set at an arbitrary angle.

According to FIG. 4, the liquid cooling system can be completely united into one unit by joining both the heat sinks 20 and 21 on the main unit case 1 side and on the display case 2 side with each other by the hinge 3. Therefore, load that may be imposed on the tube 9 during assembling work by twisting or pulling the tube can be effectively reduced. Further, handling of the liquid cooling system is facilitated, and assembling workability and maintaining workability can be significantly enhanced.

Figure 5A:
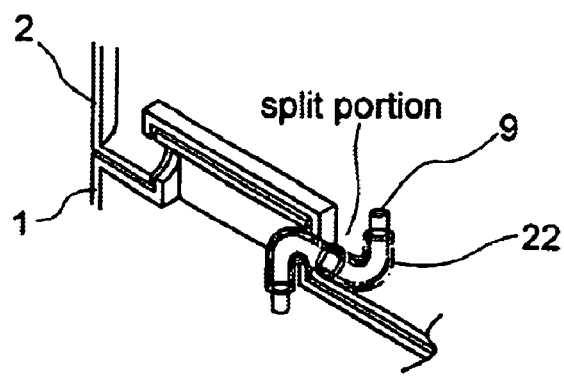
FIGS. 5(*a*) and 5(*b*) show exemplary views of the hinge portion.
Figure 5B:
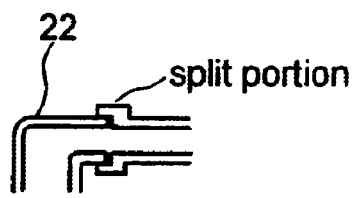

FIGS. 5(*a*) and (*b*) are drawings illustrating an example of the structure of the hinge portion 3 of the liquid cooling system in FIG. 4. FIG. 5(*a*) shows one of the two hinge of the electric device in FIG. 4. A hinge portion contained in the notebook personal computer is usually very narrow. Therefore, the tube 9 passed through these points is prone to be damaged or buckled at curved portions due to rubbing or abnormal twisting when the display case 2 is opened or closed.

In the FIGS. 5(*a*) and 5(*b*), a sleeve 22 made of metal or resin which can be split into L-shaped halves is installed around a cranked tube 9 passed through a hinge 3. Installation of the sleeve 22 prevents the tube 9 from being exposed to friction due to rubbing of the nearby case or cable when the display case 2 is opened and closed.

FIG. 5(*a*) illustrates the overall structure of the split sleeve 22 at a hinge portion, and FIG. 5(*b*) illustrates the detailed structure of the split portion of the sleeve 22. As mentioned above, the sleeve 22 passes the tube 9 therethrough and protects the tube 9. The sleeve 22 is movable with some gap maintained between the sleeve and the tube 9, and encircles the tube 9.

With the sleeve 22, damage to the tube 9 due to point contact between the tube 9 and the cases can be reduced by plane contact between the tube 9 and the sleeve 22. Further, the inner circumferential surface of the sleeve 22 at the split portion is preferably a uniform flat face for the prevention of damage to the tube 9.

Further, since the sleeve 22 is split into two halves, the sleeve does not restrain the tube 9 from being twisted when the display case 2 is opened or closed. More specifically, the two split halves of the sleeve are rotated at the split portion, and thereby follow the movement of the tube 9. Therefore, excessive load is prevented from being imposed on the tube 9 as the result of only the tube 9 being twisted. Further, the tube 9 does not buckle because the tube 9 is not bent beyond the bending radius of the sleeve 22. Thus, an electronic device wherein the inability of cooling liquid to circulate due to buckling of the tube 9, which is prone to occur at hinge 3, and damage to the tube 9 due to rubbing or the like can be prevented is obtained.

Figure 6:
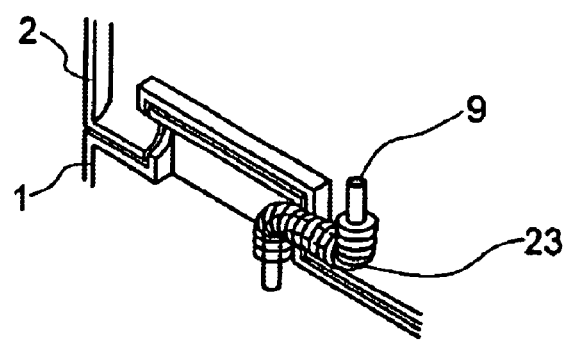
FIG. 6 is a drawing illustrating another example view of the hinge portion.

FIG. 6 is a drawing illustrating an example of another structure of the hinge portion 3 of the liquid cooling system in FIG. 4. A bellows sleeve 23 made of resin is installed around the tube 9 passed through a hinge 3 of the electronic device.

The bending radius of the bellows sleeve 23 is not reduced to a certain value in correspondence with the shape thereof. Therefore, as for the tube 9 passed through the sleeve as well, buckling due to reduction in bending radius is reduced. Also, damage to the tube 9 due to friction between the tube and the case and the like which is created when the display case 2 is opened and closed is prevented.

The structure in FIG. 4 may be applied to the electric devices in FIG. 1, 2, or FIG. 3.

Figure 7:
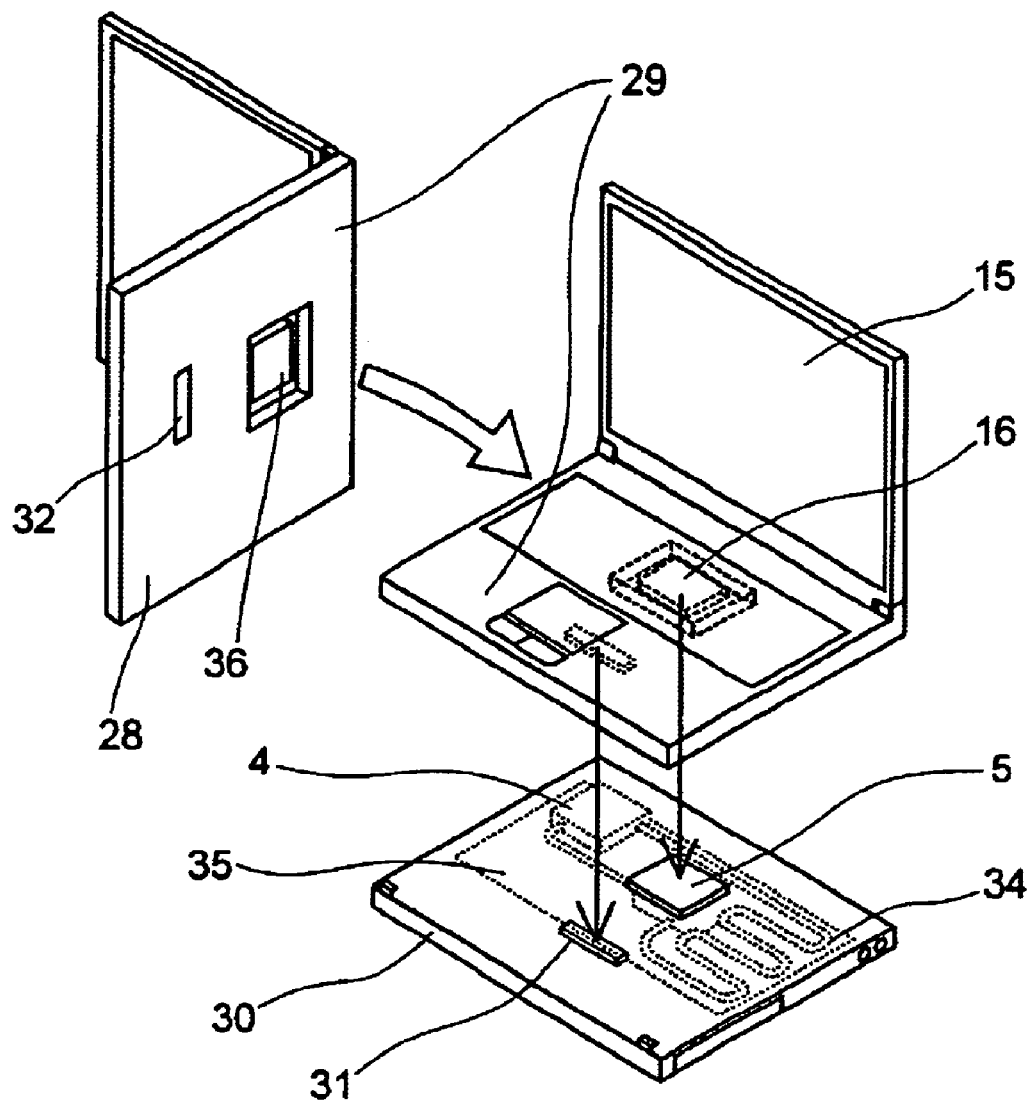
FIG. 7 is an exploded perspective view of another example of an electronic device.

FIG. 7 is an exploded perspective view illustrating the overall structure of the fourth electronic device provided with an external independent liquid cooling system (external liquid cooling system unit). The electronic device in FIG. 7 has the structure where the liquid cooling system is a unit independent of the main unit case and to be externally connected.

A liquid cooling system unit 30 is capable to be connected with the underside 28 of the main unit case 29, and is one completed unit mounted therein with a pump 4, a jacket 5, a pipe 34, and a heat sink 35. In FIG. 7, the cooling system unit is built in a docking station.

To connect the main unit case 29 to the liquid cooling system unit 30, the lower cover 28 of the main unit case 29 is opened at 36, and a heat producing electronic component 16 typified by an CPU is brought into contact with the jacket in the liquid cooling system unit 30. A power connector 31 is connected with the power opening 32 of the main unit case 29, and power to the pump 4 is supplied through the connector. Heat produced by the heat producing electronic component 16 in the main unit case 29 is transferred to the liquid cooling system unit 30 through the jacket 5, and is removed there.

In the case the main unit case 29 is carried about and solely used, the battery time is lengthened and the quantity of produced heat is reduced by lowering the driving frequency of the CPU or taking other similar means, so that the electronic device may be operated with stability without the liquid cooling system unit 30.

The structure of the liquid cooling system as completely independent external unit, in FIG. 7, ensures the safety of the main unit case from cooling liquid leakage. Further, the structure of the cooling system as separated unit allows the liquid cooling system to be used without impairing the ease of assembly of the main unit case and maintenance workability.

Figure 8:
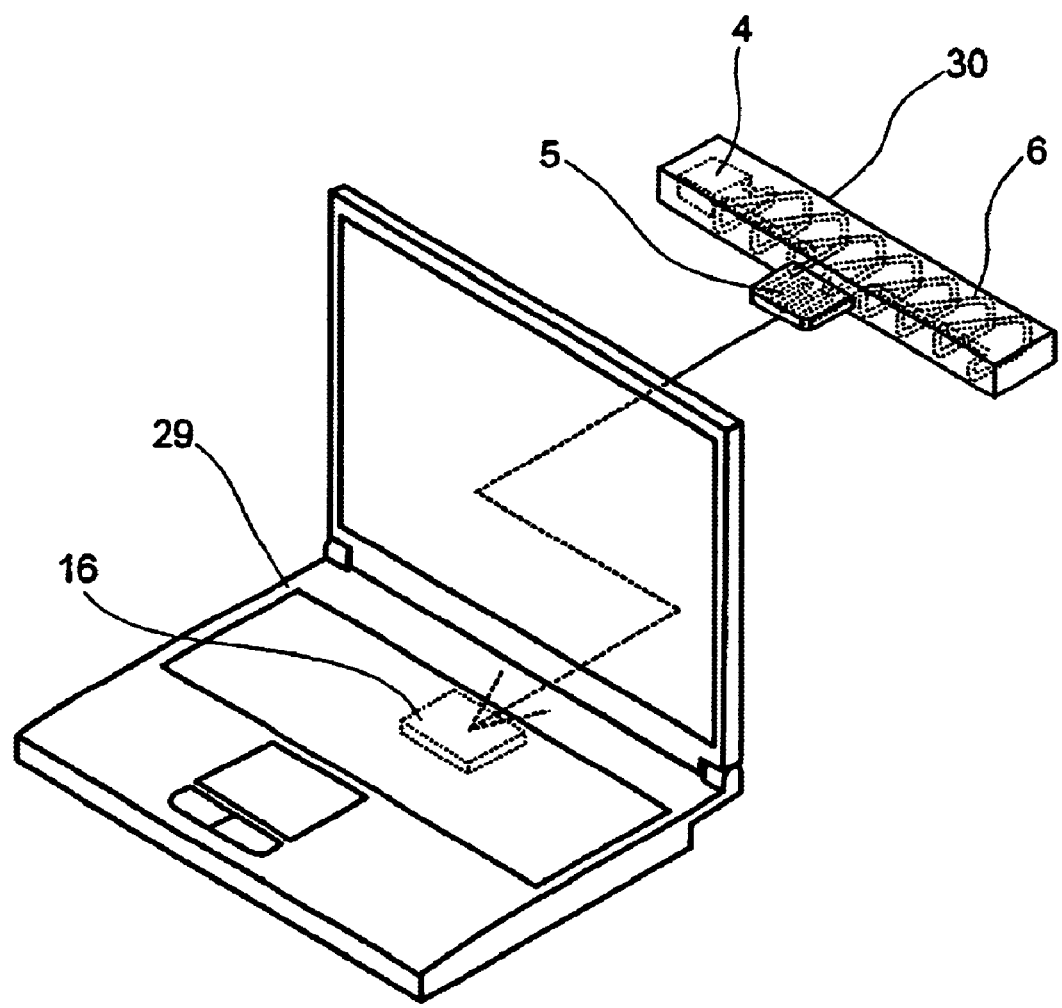
FIG. 8 is an exploded perspective view of another example of an electronic device.

FIG. 8 is an exploded perspective view illustrating the overall structure of the other electronic device provided with another external liquid cooling system. Some notebook-type electronic devices are provided with a detachable external battery, a detachable FDD, and a CD-ROM unit. The electronic device in FIG. 8 is of this type which has an external battery on the back of the main unit case and adopts the liquid cooling system.

According to the FIG. 8, a battery-shaped unit 30 incorporates a pump 4, a jacket 5, and a radiating pipe 6. In the unit, heat of a heat producing electronic component 16 in a main unit case 29 is received through the jacket 5, conveyed through the pipe 6 running throughout the liquid cooling system unit 30, and radiated from the outer face of the unit to outside air. Power to the pump 4 is supplied through the system main unit case. That is, the liquid cooling unit 30 is in the same shape as the battery unit, and is replaced with the battery unit and used when the battery unit is not used. In FIG. 8, the jacket 5 is placed opposite to the heat producing electronic component 16 and has the integral structure with the liquid cooling unit 30.

In the case the system unit is carried about, the battery is connected thereto. The battery time can be lengthened by being lowered the frequency of the CPU or the like, and the quantity of produced heat is reduced. In the case the system unit is used on the desk, the liquid cooling system unit 30 can be connected to enhance the cooling capability so that the system unit can be operated with higher performance delivered.

As described above, an electric device has the following structure: a heat sink, a pump, a jacket, a pipe, and a reservoir tank are installed in a display case and a main unit case in advance, and a main board and other devices, such as hard disk drive, are mounted thereon. Positioning of the liquid cooling system under electronic components, such as main board, facilitates assembling work and enhances workability in maintenance, such as replacement of a board. Even if liquid leaks from the liquid cooling system, the chances of the liquid's wetting the electronic components is minimized, and this contributes to the enhancement of reliability.

Further, the parts of the liquid cooling system are built on the heat sinks of a display case 2 and a main unit case 1, and then the heat sinks are installed in the respective cases to assemble electronic device. First, a pump, a jacket, a pipe, and a reservoir tank are installed on the heat sinks, and these parts are connected to one another with at least one tube. This work is conducted in the stage of part assembly to form a liquid cooling unit. The liquid cooling unit is then installed without modification in the cases, display case 2 and main unit case 1. Thus, the assembling work during installation of the liquid cooling system is facilitated, and workability and reliability can be enhanced without imposing load on the tube.

Further, in the above-mentioned electronic device, the heat sink on the display case side and the heat sink on the main unit case side are joined each other with hinge. Thus, the installation of the liquid cooling unit in the electronic device is facilitated, and the imposition of load on the connecting tube is eliminated, which leads to the enhancement of reliability.

Further, split sleeves or bellows protective tube made of metal or resin are installed around the tube passed through the hinge to protect the tube from buckling due to rubbing or too sharp bending when the display case is opened and closed. Thus, the tube is protected without restricting the movement of the tube.

In another electric device, the liquid cooling system has the independent unit structure, and is externally connected to electronic device for cooling the main unit case thereof. Thus, the electrical components in the main unit case are completely separated from the liquid cooling system, and consequently, safety from liquid leakage is ensured.

While the foregoing has described what are considered to be the best mode and/or other examples, it is understood that various modifications may be made therein and that the invention or inventions disclosed herein may be implemented in various forms and examples, and that they may be applied in numerous applications, only some of which have been described herein. It is intended by the following claims to claim any and all modifications and variations that fall within the true scope of the inventive concepts.

What is claimed is:

1. An electronic device comprising:
    a heat producing electronic component,
    a printed board mounted with the heat producing electronic component,
    a main unit case enclosing the printed board,
    a display unit,
    a display case enclosing the display unit, and
    a liquid cooling system comprising:
        a heat block between the printed board and a bottom of the main unit case and abutted against the heat producing electronic component,
        a heat sink comprising a first plate installed in the display case,
        a drive for circulating liquid between the heat block and the heat sink, and
        a second plate mounted with the heat block.
2. The electronic device according to claim 1, wherein the heat producing electronic component is mounted on a face of the printed board opposite the heat block.
3. The electronic device according to claim 1, wherein the second plate is between the heat block and the bottom of the main unit case.
4. The electronic device according to claim 1, further comprising
    a hinge which joins together the first plate and the second plate.
5. The electronic device according to claim 4, wherein the hinge comprises a sleeve.
6. The electronic device according to claim 1, wherein the heat producing electronic component is a processor.
7. The electronic device according to claim 1, wherein the electronic device is a notebook computer.
8. The electronic device according to claim 1, wherein the liquid cooling system further comprises a reservoir tank.
9. An electronic device having a liquid cooling system, comprising:
    an electronic component which produces heat,
    a first case which houses the electronic component,
    a part of the liquid cooling system, and a first board, said first board mounted with the electronic component positioned over the part of the liquid cooling system,
    a display unit, and
    a second case which houses the display unit and another part of the liquid cooling system,
    the liquid cooling system having:
        a heat block coupled to the electronic component,
        a pipe through which the cooling liquid flows,
        a pump circulating the cooling liquid,
        at least one tube which connects the heat block, the pipe, and the pump,
        a heat sink coupled to dissipate heat carried by the pipe, the heat sink comprising
            a first plate having a portion of the pipe coupled thereto for heat radiation, wherein the second case has the heat sink as the other part of the liquid cooling system, and
        a second plate mounted with the heat block in the first case.
10. The electronic device having the liquid cooling system according to claim 9, wherein
    the first board is mounted with the electronic component on the face thereof opposite the part of the liquid cooling system.
11. The electronic device having the liquid cooling system according to claim 9, wherein
    the first board is a mother board.
12. The electronic device having the liquid cooling system according to claim 9, wherein
    the part of the liquid pooling system includes the pump and the heat block.
13. The electronic device having the liquid cooling system according to claim 9, wherein
    the first case further comprises a keyboard on the first board.
14. The electronic device having the liquid cooling system according to claim 9, wherein
    the second plate is installed between the heat block and the bottom of the first case.
15. The electronic device having the liquid cooling system according to claim 9, further comprising
    a joint of the first plate and the second plate.
16. The electronic device having the liquid cooling system according to claim 15, wherein the joint comprises at least one hinge with at least one sleeve through which the cooling liquid passes.

17. The electronic device having the liquid cooling system according to claim 9, wherein the liquid cooling system further has a reservoir tank.

18. The electronic device having the liquid cooling system according to claim 9, wherein
the electronic device is a notebook computer.

* * * * *